United States Patent
Dimitrakos et al.

(10) Patent No.: US 8,595,480 B2
(45) Date of Patent: Nov. 26, 2013

(54) DISTRIBUTED COMPUTING NETWORK USING MULTIPLE LOCAL VIRTUAL MACHINES

(75) Inventors: Theo Dimitrakos, Colchester (GB); Ivan Djordjevic, London (GB); Srijith K Nair, Amsterdam (NL)

(73) Assignee: British Telecommunications public limited company, London (GB)

( * ) Notice: Subject to any disclaimer, the term of this patent is extended or adjusted under 35 U.S.C. 154(b) by 679 days.

(21) Appl. No.: 12/594,045

(22) PCT Filed: Mar. 28, 2008

(86) PCT No.: PCT/GB2008/001079
§ 371 (c)(1),
(2), (4) Date: Sep. 30, 2009

(87) PCT Pub. No.: WO2008/119961
PCT Pub. Date: Oct. 9, 2008

(65) Prior Publication Data
US 2010/0138674 A1 Jun. 3, 2010

(30) Foreign Application Priority Data
Mar. 30, 2007 (EP) .................................. 07251422

(51) Int. Cl.
*H04L 29/06* (2006.01)
*G06F 21/00* (2013.01)

(52) U.S. Cl.
USPC .................. 713/153; 726/11; 718/1; 709/205

(58) Field of Classification Search
None
See application file for complete search history.

(56) References Cited

U.S. PATENT DOCUMENTS

| | | |
|---|---|---|
| 6,185,678 B1 | 2/2001 | Arbaugh et al. |
| 6,807,636 B2 | 10/2004 | Hartman et al. |
| 6,944,643 B1 | 9/2005 | Ahmad et al. |
| 6,957,330 B1 | 10/2005 | Hughes |

(Continued)

FOREIGN PATENT DOCUMENTS

| | | |
|---|---|---|
| WO | 00/45256 | 8/2000 |
| WO | 03/091895 | 11/2003 |
| WO | 2006/011943 | 2/2006 |
| WO | 2007/099276 | 9/2007 |

OTHER PUBLICATIONS

Nair, Srijith; Djordjevic, Ivan; Crispo, Bruno; Dimitrakos; Secure Web Service Federation Management using TPM Virtualisation; Nov. 2, 2006; ACM; pp. 73-80.*

(Continued)

*Primary Examiner* — Gilberto Barron, Jr.
*Assistant Examiner* — Malcolm Cribbs
(74) *Attorney, Agent, or Firm* — Nixon & Vanderhye P.C.

(57) ABSTRACT

A distributed computer system is disclosed in which computers co-operate with one another by sending messages over a network such as the Internet in order to perform a distributed application. In order to improve the security of such system, each web service involved in the distributed application runs in a separate virtual machine. Furthermore, the virtual machines on a web server dedicated to respective web service instances utilise the same policy enforcement point—running in another virtual machine on the web-server—in order to handle messages for or from the web server. To increase security still further, each virtual machine provides virtual cryptoprocessor functionality which is used in the processing of messages sent in the performance of the distributed application.

6 Claims, 10 Drawing Sheets

(56) References Cited

U.S. PATENT DOCUMENTS

| | | |
|---|---|---|
| 6,973,657 B1 | 12/2005 | Ahmad et al. |
| 2002/0067818 A1 | 6/2002 | Barathan et al. |
| 2002/0169987 A1 | 11/2002 | Meushaw et al. |
| 2003/0004746 A1 | 1/2003 | Kheirolomoom et al. |
| 2003/0056093 A1 | 3/2003 | Huitema et al. |
| 2003/0131245 A1 | 7/2003 | Linderman |
| 2003/0196083 A1 | 10/2003 | Grawrock et al. |
| 2004/0010682 A1 | 1/2004 | Foster et al. |
| 2004/0039803 A1 | 2/2004 | Law |
| 2004/0131187 A1 | 7/2004 | Takao et al. |
| 2004/0136386 A1* | 7/2004 | Miller et al. ............ 370/401 |
| 2004/0167984 A1 | 8/2004 | Herrmann |
| 2004/0193912 A1 | 9/2004 | Li et al. |
| 2004/0249950 A1 | 12/2004 | Christensen et al. |
| 2004/0267901 A1 | 12/2004 | Gomez |
| 2005/0027837 A1 | 2/2005 | Roese et al. |
| 2005/0044197 A1 | 2/2005 | Lai |
| 2005/0081038 A1 | 4/2005 | Modiano et al. |
| 2005/0081055 A1 | 4/2005 | Patrick et al. |
| 2005/0086197 A1 | 4/2005 | Boubez et al. |
| 2005/0138416 A1 | 6/2005 | Qian et al. |
| 2005/0152542 A1 | 7/2005 | Zheng et al. |
| 2005/0160289 A1 | 7/2005 | Shay |
| 2005/0169461 A1 | 8/2005 | Canard et al. |
| 2005/0172133 A1 | 8/2005 | Brumme et al. |
| 2005/0183021 A1 | 8/2005 | Allen et al. |
| 2005/0246552 A1 | 11/2005 | Bade et al. |
| 2006/0013400 A1 | 1/2006 | Sutton et al. |
| 2006/0015728 A1 | 1/2006 | Ballinger et al. |
| 2006/0041669 A1 | 2/2006 | Bemmel et al. |
| 2006/0048210 A1 | 3/2006 | Hildre et al. |
| 2006/0069662 A1 | 3/2006 | Laborczfalvi et al. |
| 2006/0256107 A1 | 11/2006 | Scarlata et al. |
| 2007/0124797 A1 | 5/2007 | Gupta et al. |
| 2007/0239987 A1* | 10/2007 | Hoole et al. ............ 713/169 |
| 2008/0022385 A1* | 1/2008 | Crowell et al. ............ 726/11 |
| 2008/0148377 A1 | 6/2008 | Kumar et al. |

OTHER PUBLICATIONS

International Search Report for PCT/GB2008/001079, mailed May 6, 2008.
Written Opinion of the Int'l Searching Authority for PCT/GB2007/001079, mailed May 6, 2008.
Berger, S et al, "IBM Research Report RC23879, VtPM: Virtualizing the Trusted Platform Module", Internet Citation, [Online], (Feb. 14, 2006).
Gosling, J. et al, "The Java Language Environment. A White Paper", Sun Delivers Java Workshop, XX, XX, (Oct. 1995), pp. 1, 4-85.
Steven M. Bellovin, "Distributed Firewalls", Nov. 1999 issue of ;login, pp. 37-39.
Basic TrustCom reference implementation, Deliverable Sep. 19, 2005, Version 1.0, 186 pgs.
Berger, Stefan et al., "vTPM: Virtualizing the Trusted Platform Module", IBM T. J. Watson Research Center, NY, USENIX Association, Security '06, 15th USENIX Security Symposium, 16 pgs.
"Virtual Trusted Platform Module", IBM article, May 2, 2006 (4 pgs.).
Wilson, Michael D., et al. "TrustCoM Framework V2", Deliverable D29, D35, D36, Jan. 31, 2006, 90 pgs.
TCG Specification Architecture Overview, Specification Revision 1.2, Apr. 28, 2004, 54 pgs.
TCG Generic Server Specification, Specification Version 1.0, Revision 0.8, Mar. 23, 2005, 42 pgs.
OASIS Web Services Security: SOAP Message Security 1.0 (WS-Security 2004), OASIS Standard 200401, Mar. 15, 2004, 56 pgs.
Reiner, Sailer et al,, "Proceedings of the 13th USENIX Security Symposium", San Diego, CA, Aug. 9-13, 2004, 17 pgs.
Wenbo Mao et al., "Innovations for Grid Security from Trusted Computing", Hewlett-Packard Laboratories, Bristol, UK; Huazhong University of Science and Technology, Wu Han, China; Oxford University Software Engineering Centre, Oxford, UK, Jun. 7, 2005, 17 pgs.
John Marchesini et al., "Experimenting with TCPA/TCG Hardware, Or: How I Learned to Stop Worrying and Love the Bear", Computer Science Technical Report TR2003-476, Dec. 15, 2003, 20 pgs.
James Gosling and Henry McGilton, "The Java Language Environment", A White Paper, Sun Microsystems Computer Company, Oct. 1995, 86 pgs.
Web page "The Xen virtual machine monitor", University of Cambridge Computer Laboratory, 2008 (2 pgs.).
"Xen ups the security ante", 2006, (2 pgs.) downloaded from www.vnunet.com/articles/print/2137789.
Bruce Schneier, Crypto-Gram Newsletter, Aug. 15, 2002, 10 pgs. Retrieved from http://www.schneier.com/crypto-gram-0208.html.
"Trusted Computing", Wikipedia, Retrieved from http://en.wikipedia.org/wiki/Trusted_Computing, Jun. 7, 2012, 13 pgs.
Web page—"Trusted Computing" Frequently Asked Questions, Version 1.1 (Aug. 2003), 16 pgs. Retrieved from http://www.cl.cam.ac.uk/~rja14/tcpa-faq.html.
Roger L. Kay, President, Endpoint Technologies Associates "Trusted Computing is Real and it's Here", Jan. 29, 2007, 6 pgs.
Microsoft White Paper entitled "Trusted Platform Module Services in Windows Longhorn", Apr. 25, 2005 (10 pgs.).
Jon Oltsik, "Trusted Enterprise Security", How the Trusted Computing Group (TCG) Will Advance Enterprise Security, White Paper, ESg Enterprise Strategy Group, Jan. 2006, 13 pgs.
Christensen et al., Web Services Description Language (WSDL) 1.1, W3C Note Mar. 15, 2001, 31 pgs.
OASIS Web Services Resource Properties 1.2 (WS-ResourceProperties), Working Draft 04, Jun. 10, 2004, 52 pgs.
Box, Don et al., "Web Services Addressing (WS-Addressing)", W3C Member Submission Aug. 10, 2004, 23 pgs.
SOAP Version 1.2 Part 1: Messaging Framework, W3C Recommendation Jun. 24, 2003, 52 pgs.
Fielding, R. et al., Hypertext Transfer Protocol—HTTP/1.1 Memo, The Internet Society 1999, 114 pgs.
Berners-Lee, T. et al., Uniform Resource Identifier (URI): Generic Syntax Memo, The Internet Society 2005, 61 pgs.
Extensible Markup Language (XML) 1.0 (Third Edition), W3C Recommendation Feb. 4, 2004, 59 pgs.
OASIS Web Services Distributed Management: Management Using Web Services (MUWS 1.0) Part 1, OASIS Standard, Mar. 9, 2005, 30 pgs.
Tuecke, S. et al., "Web Services Base Faults (WS-BaseFaults)", Version 1.0, Mar. 31, 2004, 11 pgs.
OASIS Web Services Base Notification 1,3 (WS-BaseNotification), Public Review Draft 02, Nov. 28, 2005, 64 pgs.
Web Services Message Exchange Patterns, Draft Jul. 22, 2002, 3 pgs.
Service-oriented architecture (SOA) definition, article, Barry & Associates, date unknown, 5 pgs.
World Wide Web Consortium Suports the IETF URI Standard and IRI Proposed Standard, URI Specification Updated, IRIs Allow Internationalized Web Addressing, Jan. 26, 2005, 3 pgs.
OASIS Web Services Topics 1.3 (WS-Topics), Public Review Draft 01, Dec. 16, 2005, 39 pgs.
OASIS Web Services Brokered Notification 1.3 (WS-BrokeredNotification), Public Review Draft 02, Nov. 28, 2005, 45 pgs.
Alexey Orlov et al., "Basic TrustCom reference implementation", Deliverable 19, Version 1.0, Sep. 2005, 186 pgs.
Vecellio, Gary and Thomas, Bill, "Infrastructure-based Mediation for Enforcement of Policies in Composed and Federated Applications", The MITRE Corporation, McLean, VA, date unknown, 8 pgs.
Birrell, A. D. and Nelson, B. J., "Implementing Remote Procedure Calls", Xerox Palo Alto Research Center, ACM Transactions on Computer Systems, vol. 2, No. 1, Feb. 1984, pp. 39-59.
Common Object Request Broker Architecture: Core Specification, CORBA Specification, Mar. 2004, Version 3.0-3, 1152 pgs.
CCLRC, RAL-TR-2006-009, State of the art survey on trust, security and contract management in web services and Grid computing, Mar. 2006, 441 pgs.
Ryutov, T. and Neuman, C., "The Specification and Enforcement of Advanced Security Policies", Proceedings of the Third International Workshop on Policies for Distributed Systems and Networks (POLICY '02), 2002, pp. 128-138.

(56) References Cited

OTHER PUBLICATIONS

Dimitrakos, T. et al., "Policy-Driven Access Control and a Distributed Firewall Architecture", Proceedings of the Third International Workshop on Policies for Distributed Systems and Networks (POLICY '02), 2002, pp. 228-231.
Manes et al., The Burton Group, "Root Document Turning the Network Into the Computer: The Emerging Network Application Platform," vol. 1.0, Jul. 8, 2004, 50 pages.
RSA Security Inc., "DataPower XML Web Services Access Control and Federated Identity Management," 2005, 2 pages.
Dimitrakos et al., "Enabling Dynamic Security Perimeters for Virtual Collaborations," eAdoption and the Knowledge Economy: Issues, Applications, Case Studies, IOS Press Amsterdam, 2004, pp. 1191-1198.
Dimitrakos et al., "Towards a Grid Platform Enabling Dynamic Virtual Organisations for Business Applications," in Proc. of $3^{rd}$ Int. Conf. on Trust Management, iTrust 2005, LNCS 3477, 2005, pp. 406-410.
Dimitrakos et al., "TrustCoM—A Trust and Contract Management Framework Enabling Secure Collaborations in Dynamic Virtual Organisations," ERCIM News, No. 59, Oct. 2004, pp. 59-60.
Dimitrakos et al., "Towards a Trust and Contract Management Framework for Dynamic Virtual Organisations," eAdoption and the Knowledge Economy: Issues, Applications, Case Studies, IOS Press Amsterdam, ISBN: 1-58603-470-7, 2004, 9 pages.
Foster, "A Globus Primer Or, Everything You Wanted to Know About Globus, But Were Afraid to Ask Describing Globus Toolkit Version 4," Draft, May 8, 2005, 69 pages.
Foster et al., "The Physiology of the Grid An Open Grid Services Architecture for Distributed Systems Integration," Globus Alliance Technical Report, 2002, 31 pages.
Foster et al., "Grid Services for Distributed System Integration," IEEE Computer 2002, Jun. 2002, pp. 37-46.
Kephart et al., "The Vision of Autonomic Computing," Computer Magazine, IEEE Computer Society, Jan. 2003, pp. 41-50.
RSA Federated Identity Manager, "RSA Secured Implementation Guide for XML Gateway/Firewall Products," Version 4.3, Jun. 9, 2005, 6 pages.
Sonic Software Corporation et al., "A New Service-Oriented Architecture (SOA) Maturity Model," White Paper Released Oct. 27, 2005, 28 pages.
Barbash, "Forum Systems XWall Web Services Firewall a Solid Security Solution," WSJ: Product Review, Forum Systems, Web Services Journal, Oct. 2004, 1-2.
Ballinger et al., "Web Services Metadata Exchange (WS-MetadataExchange)," 2004, 22 pages.
Bajaj et al., "Web Services Policy Attachment (WS-PolicyAttachment)," Version 1.2, Mar. 2006, 29 pages.
Layer 7 Technologies, "XML Appliances for SOA and Web 2.0," 2006, 2 pages.
Steel et al., "Core Security Patterns," Prentice Hall & Sun Microsystems, Fig. 8-4 entitled Security Patterns and Their Relationships, Dec. 2005, 1 page.
Dimitrakos, T., "Research Challenges for the Convergence of SOA Platforms and Next Generation Networking," British Telecommunication plc, 2007, 24 pages.
Djordjevic et al., "Virtualised Trusted Computing Platform for Adaptive Security Enforcement of Web Services Interactions," 2007 IEEE International Conference on Web Services (ICWS 2007), 8 pages.
Maierhofer et al., "Extendable and Adaptive Message-Level Security Enforcement Framework," In Proceedings of the International Conference on Networking and Services, (ICNS '06), Jul. 2006, ISBN: 0-7695-2622-5, 10 pages.
Figueiredo et al., "Resource Virtualization Renaissance," IEEE Computer Magazine, May 2005, pp. 28-31.
Jiang et al., "SODA: A Service-On-Demand Architecture for Application Service Hosting Utility Platforms," Proceedings of the $12^{th}$ IEEE International Symposium on High Performance Distributed Computing (HPDC'03), 10 pages.
Mao et al., "Daonity-Grid Security with Behaviour Conformity from Trusted Computing," In Proceedings of the First ACM Workshop on Scalable Trusted Computing, ISBN: 1-59593-548-7, Nov. 3, 2006, pp. 43-46.
Creasy, R.J., "The Origin of the VM/370 Time-Sharing System," IBM J. Res. Develop., vol. 25, No. 5, Sep. 1981, pp. 483-490.
Goldberg, Robert P., "Survey of Virtual Machine Research," IEEE Computer Magazine, Jun. 1974, pp. 34-45.
Nanda et al., "A Survey on Virtualization Technologies," Research Proficiency Report, Stony Brook, ECSL-TR-179, Feb. 2005, pp. 1-42.
Leiva et al., "A Grid Computing for Online Games," In proceedings of Game Design and Technology Workshop 2006 (GDTW'06), Nov. 2006, pp. 1-5.
Patrick McDaniel et al.; 1999; "Antigone: a flexible framework for secure group communication"; In Proceedings of the $9^{th}$ Conference on USENIX Security Symposium—vol. 8 (SSYM'99); vol. 8; USENIX Association, Berkeley, CA, USA pp. 99-114.
Hongbin Liu, Geoffrey Fox, Marlon Pierce, Shrideep Pallickara; A Multi-party Implementation of WS-SecureConversation Technical Report, Apr. 2005., 13 pgs.
State of the Art Evaluation—phase 1, WP10 State of the Art Deliverable; Imperial College London, Jun. 10, 2004, Issue 1; 374 pgs. (with emphasis on pp. 283-290).
Sandro Rafaeli and David Hutchison; 2003; "A survey of key management for secure group communication"; ACM Comput. Surv. 35; 3 (Sep. 2003); pp. 309-329.
Workshop on Grid Security Practice and Experience (UK e-Science Security Task Force), Oxford, Jul. 8-9, 2004; see especially "Dynamic Security Perimeters for Grid-enabled Collaboration" by T. Dimitrakos et al., and "Multilayer Privilege Management for Dynamic Collaborative Scientic Communities" by David Chadwick et al., 25 pgs.
Anderson, R. et al.; "Cryptographic Processors-A Survey"; Proceedings of the IEEE; vol. 94, No. 2; pp. 357-369; Feb. 2006.
N. Asokan and P. Ginzboorg; "Key agreement in ad hoc networks"; Computer Communications; vol. 23; Issue 17; Nov. 1, 2000; pp. 1627-1637.
T. Garfinkel et al.; "Terra: a virtual machine-based platform for trusted computing"; SIGOPS Oper. Syst. Rev. 37, 5 (Oct. 2003)., 14 pgs.
M. Rosenblum and T. Garfinkel; "Virtual machine monitors: current technology and future trends"; *Computer*; vol. 38, No. 5; pp. 39-47; May 2005.
Book Chapter; Authors: L. Chen and T. Pedersen; Editor: De Santis, Alfredo; Primary Title: New group signature schemes; Book Title: Advances in Cryptology—EUROCRYPT'94; Book Series Title: Lecture Notes in Computer Science; Copyright: 1995; Publisher: Springer Berlin/Heidelberg; Isbn: 978-3-540-60176-0; Subject: Computer Science; Start p. 171; End p. 181; vol. 950.
Luis Felipe Cabrera et al.; Web Services Coordination (WS-Coordination); Version 1.0; Aug. 2005; 23 pgs.
B. Lehane et al.; Shared RSA key generation in a mobile ad hoc network; In Proceedings of the 2003 IEEE conference on Military communications—vol. 11 (MILCOM'03); vol. 11; IEEE Computer Society, Washington, DC, 2003; pp. 814-819.
Djordjevic et al., "Dynamic security perimeters for inter-enterprise service integration"; Future Generation Computer Systems; vol. 23; No. 4; (Feb. 2, 2007); pp. 633-657.
Chivers, H. et al., "Workshop on Grid Security Practice and Experience (UK e-Science Task Force)," [Online], Jul. 8, 2004.

\* cited by examiner

| Endpoint Reference | Indirect Reference |
|---|---|
| EPR1 | 'partition 1' |
| EPR2 | 'partition 2' |
| ………. | ………. |
| EPRN | 'partition n' |

Figure 3A

| Indirect Reference | Virtual Machine ID |
|---|---|
| 'partition 1' | VM_1 |
| 'partition 2' | VM_2 |
| …………… | ……… |
| 'partition n' | VM_n |

Figure 3B

DISTRIBUTED COMPUTING NETWORK USING MULTIPLE LOCAL VIRTUAL MACHINES

This application is the U.S. national phase of International Application No. PCT/GB2008/001079 filed 28 Mar. 2008, which designated the U.S. and claims priority to EP Application No. 07251422.7 filed 30 Mar. 2007, the entire contents of each of which are hereby incorporated by reference.

BACKGROUND AND SUMMARY

The present invention relates to a distributed computer system and a method of operating a distributed computer system.

The advent of the Internet has meant that it is now much more common for groups of computers to co-operate with one other in some sort of common endeavour. Examples include distributed application programs, different parts of which run on different computers connected to the computer network. The most widely-researched distributed application programs are programs which integrate 'Web Services' running on different computers. 'Web Services' are one example of components that might be assembled in accordance with a 'Service Oriented Architecture'. Other known technologies might be used in to build distributed applications—e.g. the Common Object Request Broker Architecture or Enterprise Java Beans.

There is a need for security in such systems. This is especially true of inter-enterprise distributed application programs where computers in one enterprise co-operate with computers in a different enterprise. Whilst an enterprise's system administrator might trust computers administered by that enterprise not to behave maliciously, he is much less likely to trust computers administered by another enterprise to do so.

The conventional technology for securing enterprise networks—i.e. one or more firewall computers through which all traffic entering or leaving the network must pass—is not well suited to inter-enterprise applications. This was recognised in the paper 'Distributed Firewalls' by Steven Bellovin which appeared in the November 1999 issue of; login:, pp. 37-39.

It is known to be useful to make system administration policy-based. Policies, as their name suggests, may be applied by a system administrator to a large number of computers in the network administered by that administrator.

In the architecture proposed in the EU research project TrustCOM (see http://www.eu-trustcom.com/) 'Policy Enforcement Points' (PEPS) and 'Policy Decision Points' are used to provide security functionality to distributed applications formed from a plurality of Web Service components. According to that architecture, the 'Policy Enforcement Points' can be co-located with a web-service and/or placed on a node that serves a large number of computers (e.g. a firewall). A message sent between two components of a distributed application may have to pass through a plurality of PEPs. Policy Decision Points are separated from PEPs in the architecture—they can provide access control lists and the like and may be referred to by a PEP when that PEP carries out one or more enforcement actions. The architecture is described in TrustCOM deliverable D19 entitled 'Basic TrustCOM reference implementation'.

A known way of protecting an enterprise's IT systems from malicious attacks by outsider is simply to isolate the IT systems from the outside world. However, the need to utilise the communication capabilities of the Internet in order to provide a communication channel to customers and suppliers means that this approach is no longer commercially realistic.

When allowing outside access to an IT system, the enterprise must seek ways of preventing malicious code detrimentally impacting the functioning of the enterprise's IT system. One component of defence is to isolate software processes introduced from outside from internally generated software processes. Process isolation can be enforced in a number of ways. Different processes can be run on different computers. However, this disadvantageously increases the power consumed in order to perform a distributed application (though in inter-enterprise distributed applications, some distribution might be inevitable if the enterprises involved keep the computers taking part in the distributed application within their geographical sites).

Where processes are run on the same computer, an interpreter program can allow an external program to access a limited area of memory (e.g. the 'sandbox' in which Java applets are allowed to run).

More generally, most operating systems use a CPU's memory management hardware to provide process isolation, using two mechanisms. First, processes are only allowed access to certain pages of physical memory. Second, privilege levels prevent untrusted code from manipulating the system resources that implement processes. However due to the high overhead involved with context switching, inter-process communication etc., it is not feasible for every process to be isolated in such a manner.

Thus in almost all commercial systems, code and data are loaded onto same address space and more importantly, shared memory is still used between processes. This means that not only a malicious process could effect another process, but also that unintended failure of one process can effect the other.

Another way of isolating processes from one another is to provide many 'virtual machines' on a single computer. This is common on mainframes, and enables many operating system programs to run in parallel on the same machine. Hard disk drive partitioning is another example of virtualization. As the expression 'virtual machine' suggests, a virtual machine can emulate a real computer without requiring the separate processor, disk drive, network card and the like that would be required to provide another real computer. Whilst the vast majority of virtual machines will provide virtual processor capacity and memory, not all will provide virtualised versions of all the hardware they are built on—for example not all virtual machines will provide virtual network cards—and hence virtual IP addresses.

Some computers include a hardware Trusted Platform Module and it has been suggested that virtual machines which include a virtual Trusted Platform Module could be provided on such a computer. Examples are the virtual machines disclosed in US Patent application 2006/0256107, US Patent application 2005/0246552, and IBM Research Report RC23879 'vTPM: Virtualizing the Trusted Platform Module'.

With virtual machines, each VM partition is given a different virtual address space. Thus, the programs running on one VM cannot in any way access the memory space of another VM. Of course one could go to the extreme of providing a VM at the process level in such a way that each process has a different virtual address space but this would involve an undesirable amount of extra processing.

Also important to note is that virtual machines not just provide isolation in terms of memory access etc. but also in terms of resource usage. For example, a VM could be started with a virtual memory of 512 MB and if a process that is run inside starts behaving anomolously and uses up 400 MB, its effect will be limited to within other processes in the same VM. Other processes in other VMs will not be effected since they use their part of the resource.

Emerging hardware developments are likely to improve hardware support for virtualisation. 'Virtual machines' could be mapped onto each of the processors in a multi-core chip, for example. However, as yet, few applications (stand alone or distributed) are written to take advantage of the improved hardware support for virtualisation.

The present inventors have realised that there are many benefits to be obtained by mapping their security architecture onto virtual machines.

According to a first aspect of the present invention, there is provided a computer within a network of computers which interact by passing messages between them in order to perform a distributed application, said computer being arranged in operation to:

i) provide two or more virtual machines, each with its own access control mechanism;
ii) in a first virtual machine, execute one or more local components of the distributed application;
iii) intercept messages for or from local components of said distributed application;
iv) on intercepting a message, execute, in a second virtual machine, a message handling program to perform one or more security actions on each intercepted message.

By keeping and executing message handling programs in a separate virtual machine to a local component whose messages are intercepted by said message handling programs, and having separate access control mechanisms for each virtual machine, one party can be provided with control of message-handling programs whilst another party is provided with control of one or more local distributed application components. This allows those administering the network of computers to control messages sent between the computers in the network (thus enabling the network operator to counter security concerns affecting the network) whilst allowing others to alter local distributed application components (thus providing the benefit of easily updateable distributed applications). This leads to better utilisation of the computer network's resources.

Robustness is provided because the message handling programs are on the same node as the distributed application component they protect and hence are not vulnerable to being accidentally or maliciously circumvented by a change in the topology of the nodes of the distributed computer. Efficiency results since only a single piece of hardware is required for both the message handling program and the distributed application component.

Preferably, the message handling program is configurable by a policy stored in the first virtual machine. This has the advantage that the behaviour of a distributed computer can more easily be updated by a system administrator.

Preferably said computer supports a plurality of local components, each local component being loaded and executed in a local-component-hosting virtual machine dedicated to that local component.

This provides the advantage that local components are isolated from one another since they can only effect the virtual machine they are in. Furthermore, each virtual machine, and hence the local component inside it can be set up with configurable upper limits on resource (e.g. memory, CPU) usage. Yet further, the virtual machines help in preserving the integrity and confidentiality of the data used by the various local components. Yet further still, since virtual machines are isolated stand-alone entities, the administration of local components running within different virtual machines can be handled by different administrators.

Preferably, each local component has an applicable policy stored in the message-handling virtual machine, said message handling program being configured by selecting an applicable policy in dependence on the local component to which said intercepted message relates.

This enables the network administrator to arrange for messages for or from different local components to be handled in different ways.

The inventors have realised that using nodes which include a hardware Trusted Platform Module and providing thereon virtual machines which include a virtual Trusted Platform Module (e.g. the virtual machines disclosed in US Patent application 2005/0246552, and IBM Research Report RC23879 'vTPM: Virtualizing the Trusted Platform Module'), further improves the security of the distributed application.

Thus, in particularly advantageous embodiments, said computer node includes tamper-resistant hardware which stores one or more cryptographic keys (especially one or more private keys), and said message-handling virtual machine and/or one or more of said local-component-hosting virtual machines provides its own virtualised version of that tamper-resistant hardware.

In preferred embodiments, one or more of said virtual machines support remote attestation. Thus, for example, a remote user of a local component can check the status of the local component instance's environment.

In preferred embodiments, each virtual machine supports encryption and sealing: the private key and keys generated from it can be used to encrypt data so that any entity outside the virtual machine cannot gain access to the data. Furthermore using sealing these data can be tied to the state of the local component instance that is running in the local-component-hosting virtual machine.

BRIEF DESCRIPTION OF THE DRAWINGS

There now follows, by way of example only, a description of specific embodiments of the present invention. The description refers to the attached drawings in which:

FIGS. 3A and 3B show address mapping tables used in communications between virtual machines provided on the same computer;

DETAILED DESCRIPTION OF PRESENT EXAMPLE EMBODIMENTS

Figure 1:
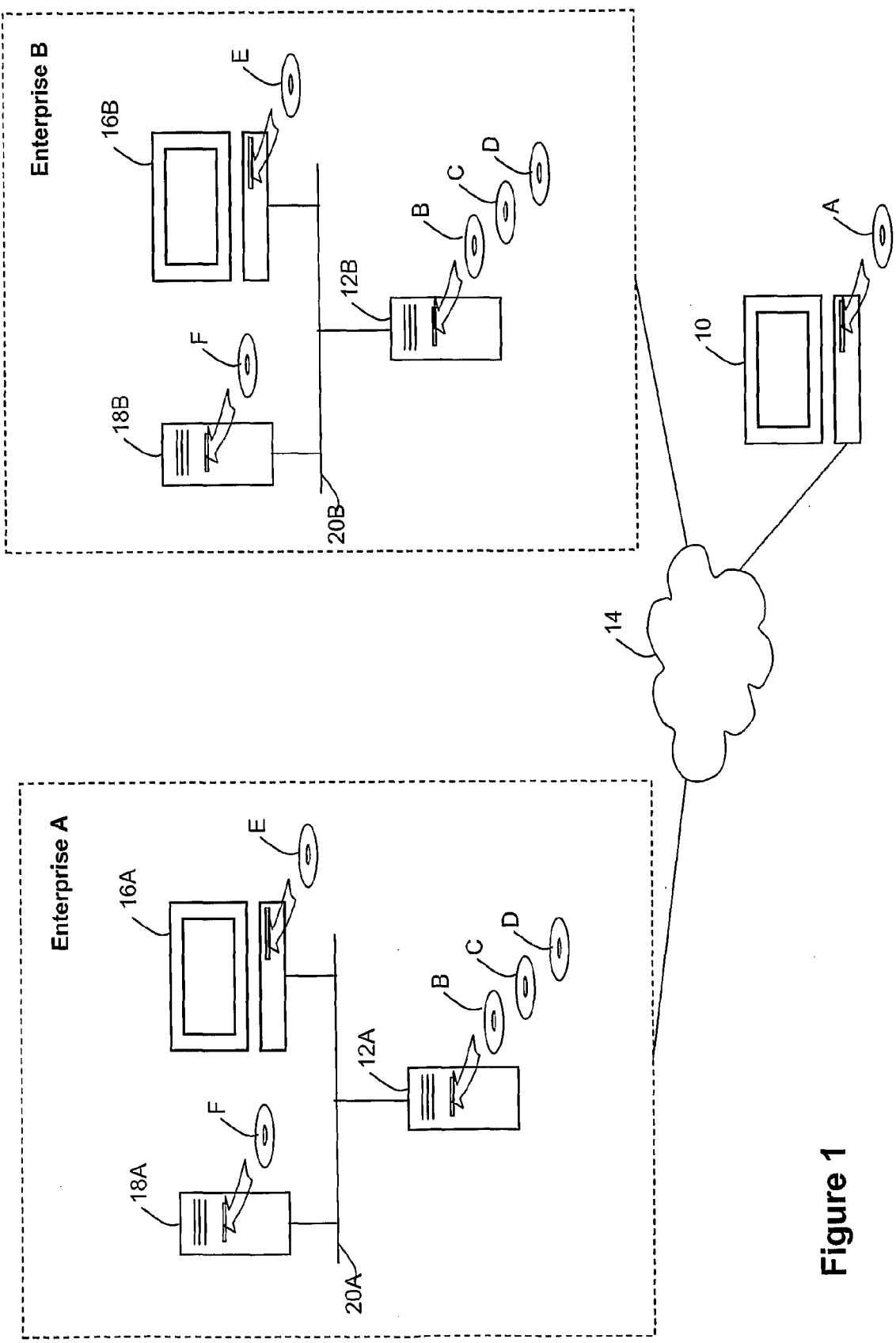
FIG. 1 shows a group of web server computers co-operating to form a virtual organisation which creates and executes a distributed computer application as part of a service for a customer who interacts with that virtual organisation using his personal computer.

FIG. 1 shows an example of a computer network which implements a first embodiment of the present invention. The computer network includes a customer's PC 10 which can be connected to a first enterprise's web server computer 12A via the Internet 14. The first enterprise's server is in turn connected to an administration computer 16A and a utility services server computer 18A by a private network 20. The web server computer 12A includes Trusted Platform Module hardware as described in the Trusted Computing Group's 'TCG Generic Server Specification' version 1.0.

The customer's PC 10 is provided with browser software which enables the customer to interact with the web-server 12A. A browser might be installed from CD-ROM A. Such browser software is well known and will not be described further.

The first enterprise's web server computer 12A is provided with virtualization software like the open source Xen hypervisor available from www.xensource.com which supports a virtual TPM implementation (as disclosed in IBM Research Report RC23879—'vTPM: Virtualizing the Trusted Platform Module') and further discussed in the web-page 'Virtual Trusted Platform Module' found at http://dominosesearch.ibm.com/comm/research_projects.nsf/pages/ssd_vtpm.index.html Alternatively, software as disclosed in US Patent application 2005/0246552 might be provided. As yet another alternative, the software disclosed in international patent application WO 2006/011943 might be used.

Such virtualisation software is installed on each web server from CD-ROM B. Installation of this software has the result that the Trusted Platform Module's secure storage and cryptographic functions are available to each virtual machine created on the web server 12A.

Figure 2:
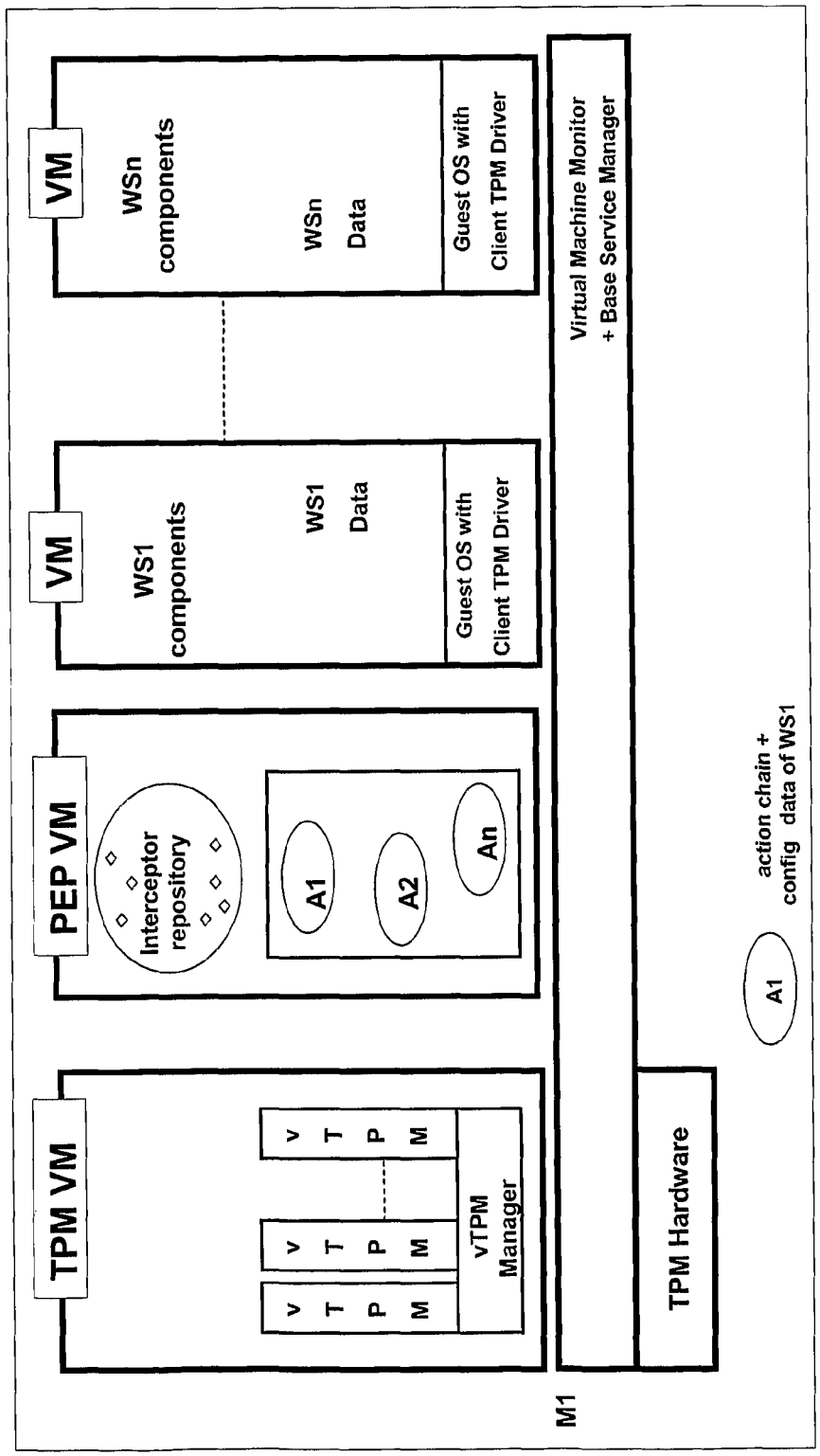
FIG. 2 shows virtual machines created one or more of the web server computers.
Figure 4:
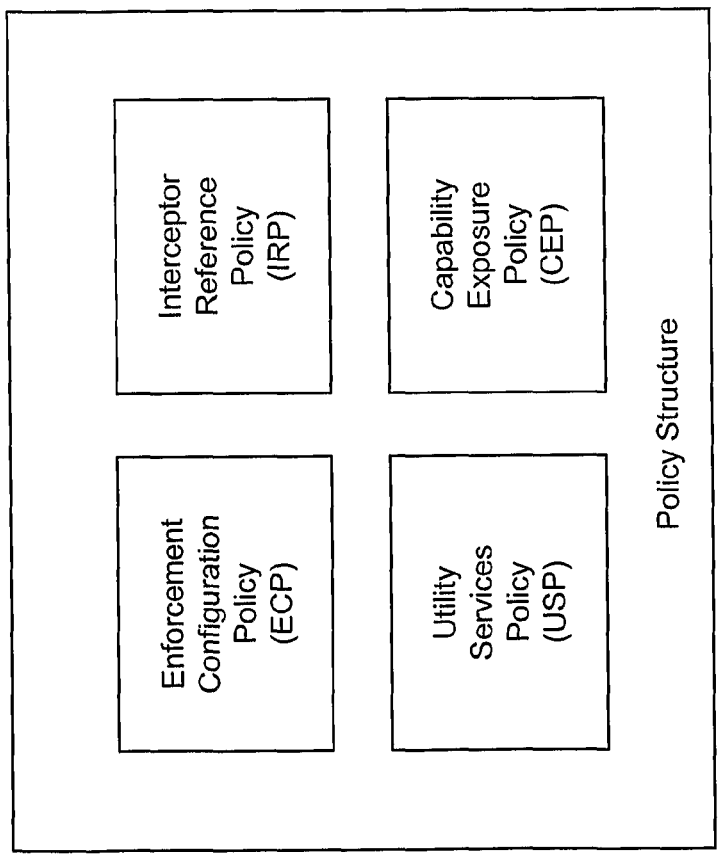
FIG. 4 shows a policy architecture as proposed in the TrustCOM project and used in the first embodiment.
Figure 5:
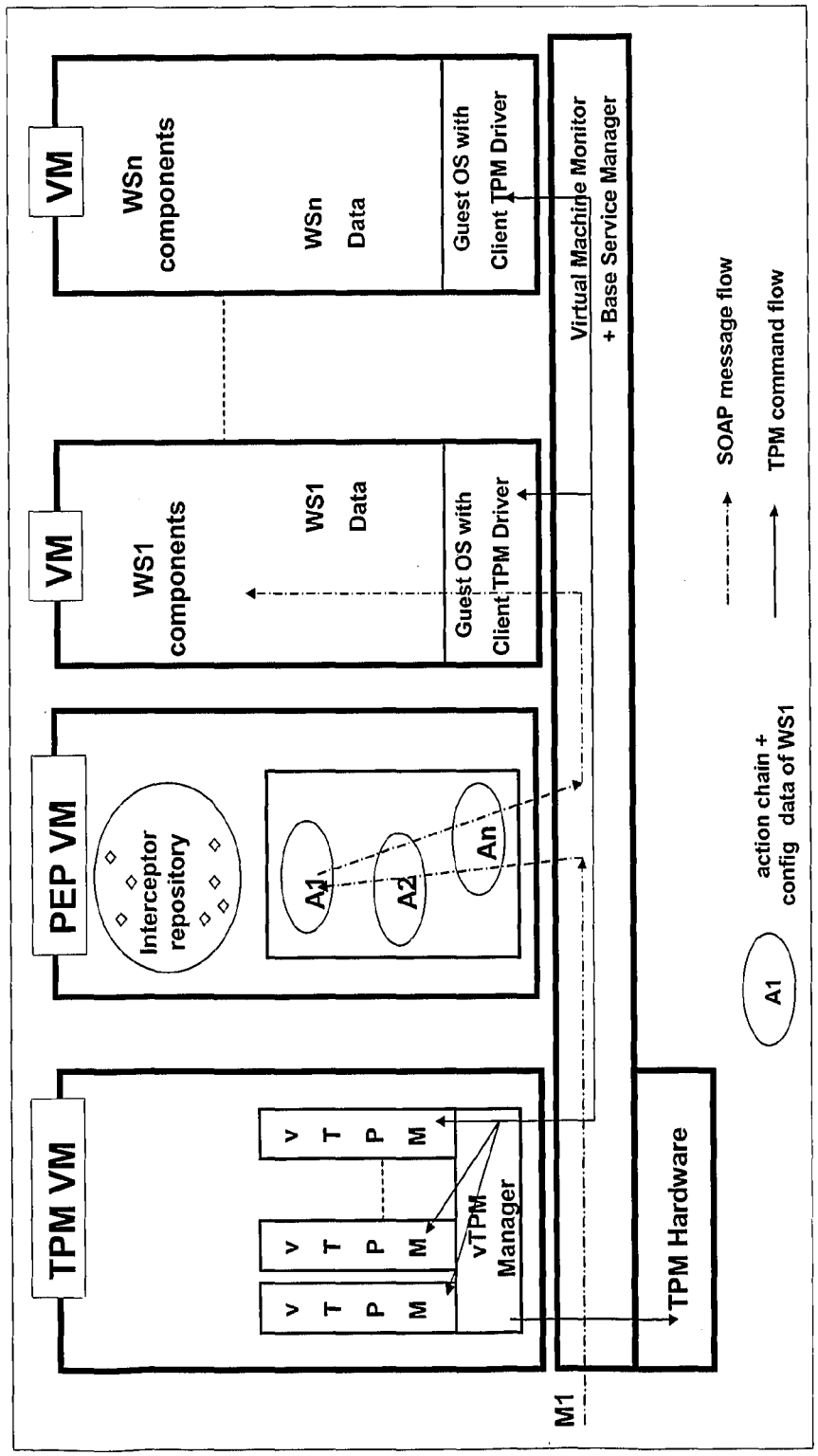
FIG. 5 is like FIG. 2 but additionally shows the path of inbound messages arriving at the virtualised server computer.

Referring to FIG. 2, the installation of the virtual TPM software initially generates a Virtual Machine Monitor and a Base Service Manager) that controls the setting up of further virtual machines. The Base Service Manager has the information to authenticate each virtual machine and (by matching the keys-related information) can control access to/from different virtual machines.

The Base Service Manager provides an administration interface. It will be understood that this interface might be used by an administrator using administration computer 16A to manipulate the operation of the web server 12A. The Base Service Manager provides TCP/IP communications stack software which receives messages from and transmits messages to one or more network interface cards that each Web Server 12A, 12B computer has. As a consequence, all incoming and outgoing messages are exposed to the Base Service Manager. These messages are sent between the computers using the HyperText Transfer Protocol. The Base Service Manager recognises HTTP requests and responses which contain XML and extracts the XML from such messages—it will be understood by those skilled in the art that handlers which convert HTTP requests and responses to XML are well-known.

Thereafter, the computer's administrator creates a Policy Enforcement Point virtual machine (PEP VM). The setting up of the other virtual machines seen in FIG. 2 (WS1 VM, WS2 VM and WS3 VM) will be explained below in relation to the deployment of a distributed application which combines web services running on web servers 12A and 12B).

Having set up the PEP VM one or more message handling programs (referred to as 'interceptors' or 'handlers' in the present embodiment) are installed on that virtual machine from CD-ROM C. The security programs include a core enforcement component to which the Base Service Manager passes all XML messages arriving at the server computer 12A. The core enforcement component includes an XML processor able to process an XML stream (in this embodiment the XML processor is provided by the SAX software package). Having a PEP virtual machine shared by multiple virtual machines running web service components for different distributed applications leads to a reduction in the amount of storage space required at the node since those routines need only be stored once rather than on each separate virtual machine. Since a library of such routines must include routines for all the routines which might be called, this represents a significant memory saving.

As described by the adaptive enforcement architecture that has been presented in the TrustCOM deliverables D19 and D29-35-36 before a SOAP message is delivered to a web service instance, it is passed through a number of Policy Enforcement Points (PEPs). PEPs are responsible intercepting the message and for enforcing series of enforcement actions in compliance with some configuration policy. This process could include for example, checking the signature, performing decryption of certain parts of the message, verifying the content of the message, checking for the presence of group tokens etc. The message is delivered to the recipient only after the PEP verifies that the message complies with the PEP configuration policy. The enforcement actions that the PEP needs to perform are implemented by SOAP Interceptors and can be sequentially grouped together into something called interceptor chains. The enforcement process is based upon the composition of interceptor chains which is a process based on the amalgamation of the message content analysis and the security requirements of the protected resource derived form the configuration policy. Based on the outcome of this fusion the selected interceptors are inserted into the chain. The interceptors in a chain may be deployed locally or they can be distributed over the network and be invoked remotely. In the present example, the PEP virtual machine is loaded with software providing such a Policy Enforcement Point.

The administration computer 16A has a Web-Service Distributed Management implementation such as Apache MUSE or any other implementation that supports WSDM protocol stack (e.g. IBM Websphere, CA WSDM) or the WS-Management stack (e.g. Microsoft .NET WSE) installed upon it from CD-ROM E (it will be realised that WS is a common abbreviation for Web Services). This enables an administrator to load configuration files and policies into the web-server computer 12A in order to control its operation as will be described below (policies are normally more dynamic that configuration files—i.e. more frequently updated—especially they are often updated during the execution of the application they control).

Using that interface, the administrator can load policies which are not specific to a given instance of a web-service into the PEP VM. In particular, the administrator might load the interceptor reference policy (IRP), and the Utility Service Policy (USP) described in the applicant's co-pending international application WO 2006/011943.

The utility service server computer 18A is provided with software providing one or more utility services (e.g. certificate verification, security token validation) from CD-ROM F.

As was mentioned above, in this example, Enterprise A collaborates with Enterprise B in order to provide the customer with a desired service. Enterprise B has a similar set of similarly programmed computers to Enterprise A. The web servers of the enterprises involved in the collaboration can provide a distributed application by sending messages between separate components which are combined together to form the distributed application.

There is a need for modern enterprises to rapidly introduce new products and services to the marketplace. This requires the ability to quickly assemble software components to provide a distributed application which provides or assists in providing the new product or service to the customer.

Figure 6A:
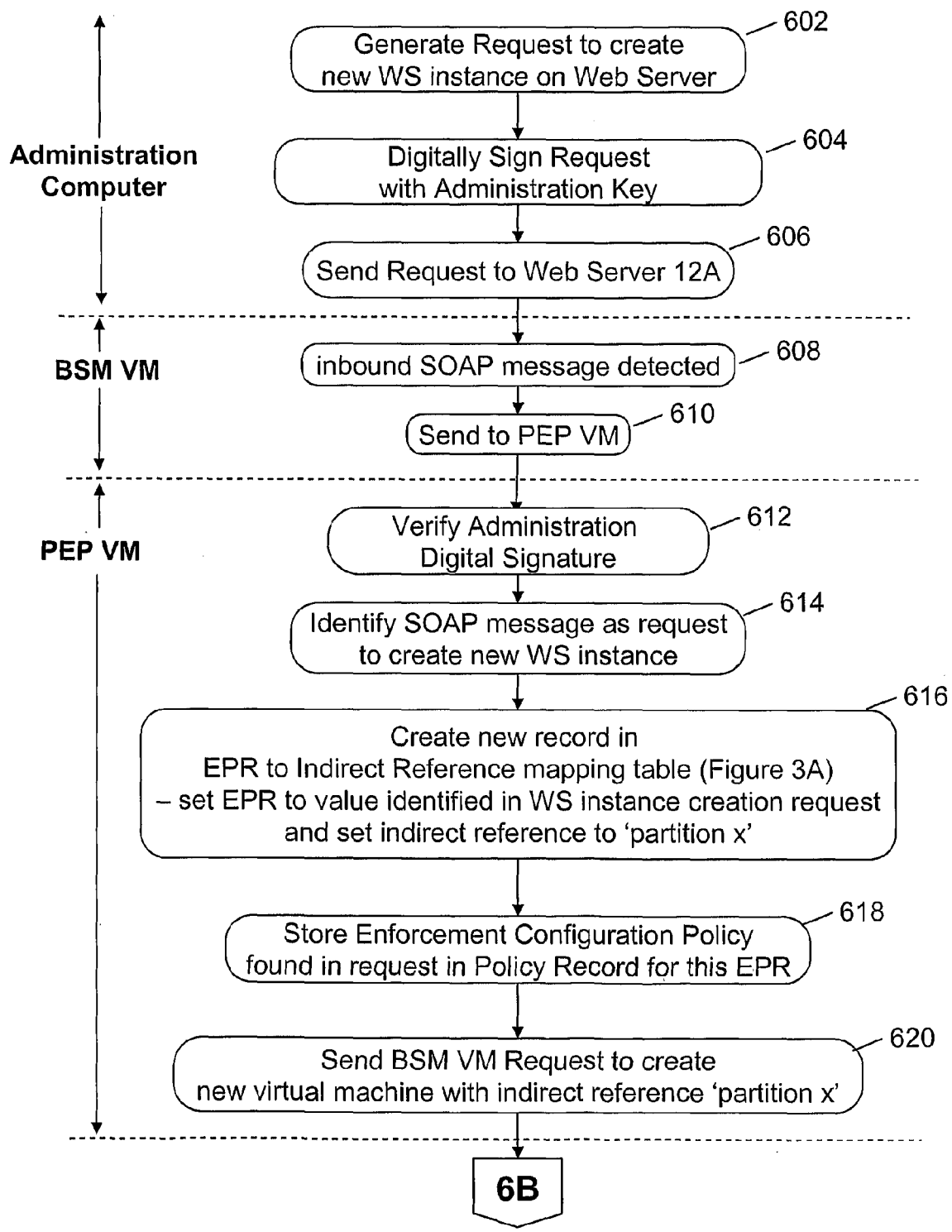
FIGS. 6A and 6B show the processing which takes place when an administrator creates a new web service instance virtual machine on a web server.
Figure 6B:
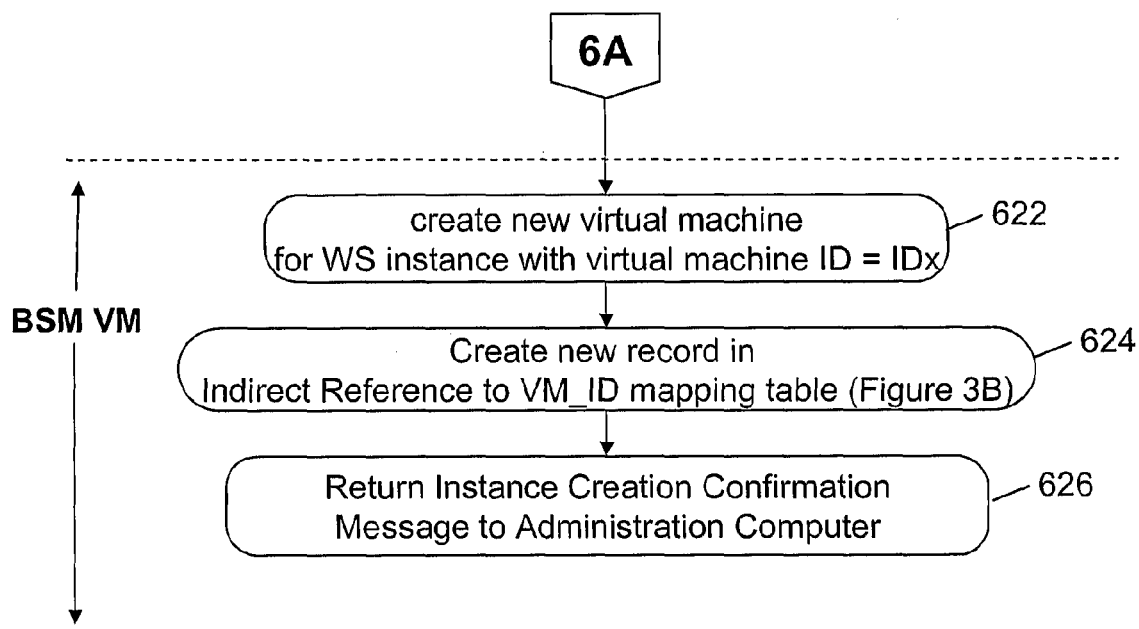

In the present example, these software components take the form of web services. The installation of new web services on the web server computers 12A, 12B will now be explained with reference to FIGS. 6A and 6B.

The software on the administration computer 16A, 16B provides an administrator with a graphical user interface which allows the administrator to install a new web service instance on the web server 12A, 12B. Using that interface, the administrator generates a request (step 602) to create a new web service instance on the web server. The request includes an EPR value for the new web service, and an Enforcement Configuration Policy which sets out which handlers from the interceptor pool in the PEP VM should be applied to messages for or from the web service and in what order. The administration computer 16A, 16B signs that request (step 604) with a private administration key and sends (step 606) the signed request to the web server 12A, 12B.

The message arrives at the Base Service Manager virtual machine where it is found to be a SOAP message (step 608) and sent (step 610) to the Policy Enforcement Point virtual partition.

The PEP VM then verifies (step 612) that the message comes from the administrator and identifies (step 614) the SOAP message as a request to create a new WS instance. This results in the creation of a new record in the PEP VM's EPR to Indirect Reference mapping table (FIG. 3A) and the setting of the EPR value in that record to the EPR value in the WS instance creation request and the indirect reference to a unique value—e.g. 'partition x' (step 616).

The Enforcement Configuration Policy for the request is then stored (step 618) in a policy record (e.g. A1 in FIG. 2).

The PEP VM then sends (step 620) a request to the Base Service Manager to create a virtual machines on which the new web service instance will run. The Base Service Manager virtual machine then creates (step 622) the new virtual machine and a new record (step 624) in its indirect reference to VM_ID mapping table (FIG. 3B).

Into each of those virtual machines, the administrator loads the components of the web service and any underlying software needed to run it. For example if the Web Service were written in Java then the administrator would also load Apache Tomcat software or Apache Axis software. If, alternatively, the Web Service were a .NET component then the administrator would also load Microsoft VStudio, or Microsoft WSE.

Once the process is complete the Base Service Manager returns confirmation (step 626) to the administration computer 16A, 16B that the web instance has successfully been installed.

It is to be understood that loading the web services into different virtual machines provides the advantage of secure isolation between several distinct exposures of a (web) service of the same type—and indeed between web services of a different type.

Once the virtual machine for the WS instance is built, the virtual TPM included with the virtual machine creates a key pair for the WS instance. The public key of this pair is then advertised as the public key of the WS instance and the private part is encrypted with the Storage Root Key (SRK) of the virtual TPM. Any data sent for the WS instance can then be encrypted with this public key. In addition, a "signature" key-pair can be created for each service instance. In general, an arbitrary number of the "crypto" material, secret(s) etc. can be created for various purposes and protected by the virtual TPM as the private key above.

The public key(s) of the key-pair(s) could be signed by the attestation key of the virtual TPM (whose key could in turn be signed by the TPM of the Base Service Manager). This is particularly useful for security auditing and traceability of the creation and management of virtual machines on the web servers 12A and 12B.

The passing of messages between different computers within the distributed computer running the distributed application will now be explained with reference to FIGS. 7 and 8.

Figure 7:
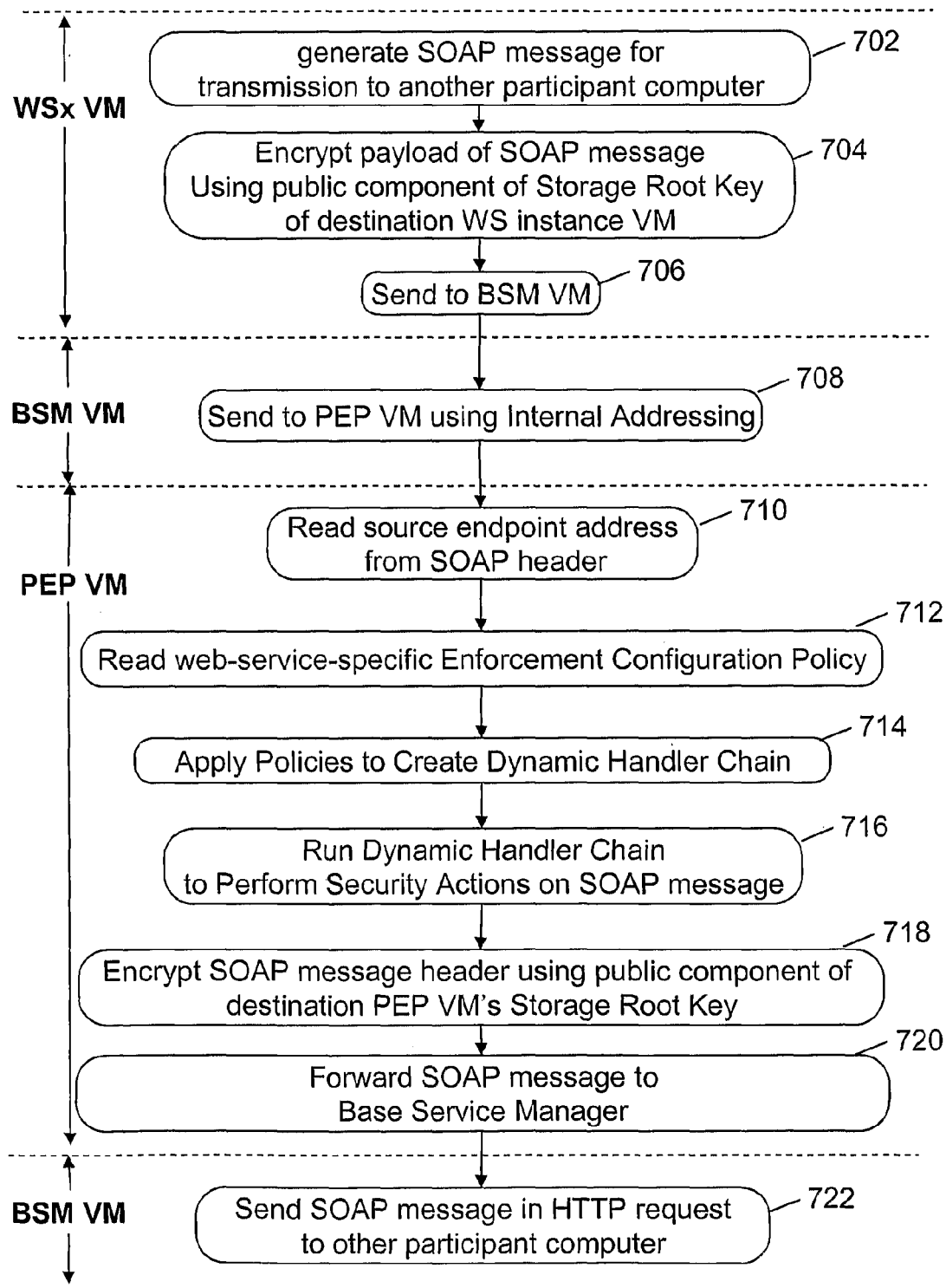
FIG. 7 shows how outbound messages are processed by the virtualised server computer.
Figure 8:
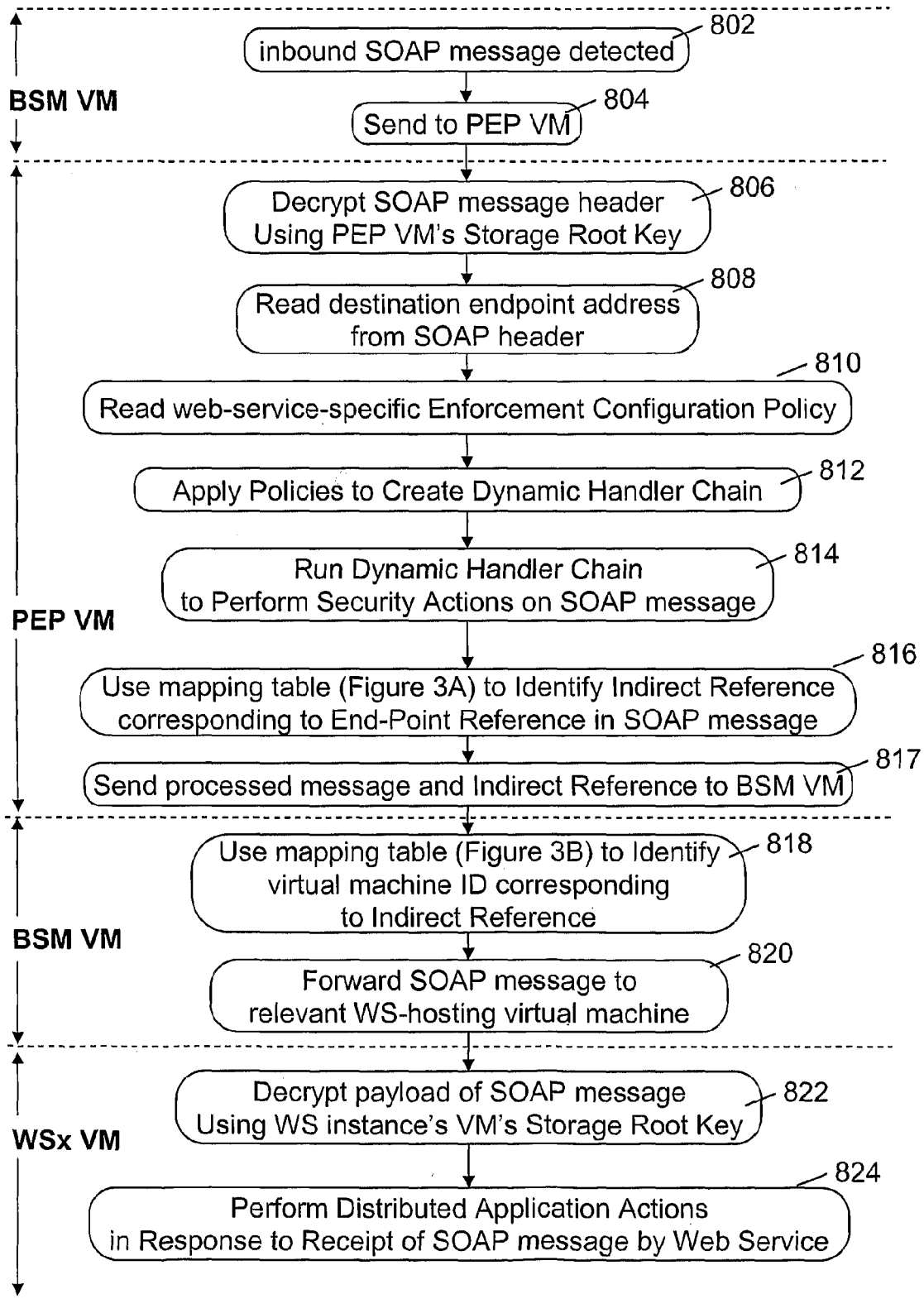
FIG. 8 shows how inbound messages are processed by the virtualised server computer.

When, as part of the operation of a distributed application a web service running on web server 12A needs to send a request message to web server 12B, the web server follows the steps illustrated in FIG. 7.

The web service running on its dedicated virtual machine on web server 12A first generates (702) a SOAP message including message headers. In order to protect the data being passed between the two web servers from eavesdropping, the web service encrypts (704) the application data included in the SOAP message using the public component of the virtual Storage Root Key of the destination WS instance virtual machine. In preferred embodiments, the public key is included within a certificate, which includes the public key signed by the private attestation key of the Trusted Platform Module included within Enterprise B's web server 12B.

The web service then forwards (706) the SOAP message to the Base Service Manager virtual machine running on the same web server 12A. It provides a dummy address for the PEP VM (FIG. 3A, right-hand column), which the Base Service Manager resolves using its indirect addressing table to the correct internal address and send (step 708) the message to the PEP VM. This indirect addressing mechanism is used in all communications between the WS instance or PEP virtual machines in order to maintain the desired degree of isolation between those virtual machines and improve the security of the web-server.

The policy-driven security program running on the PEP virtual machine then reads (710) the source endpoint address and other declared identification meta-data from the header of the SOAP message, and opens (712) the Enforcement Configuration Policy which applies to the source of the SOAP message. As explained in the TrustCOM deliverables mentioned above, the textual descriptions of security actions included with the Enforcement Configuration Policy are first resolved to specific algorithms which need to be applied using the Interceptor Reference Policy, and then further resolved using the Utility Services Policy to specific handlers which implement the specific algorithms.

The PEP virtual machine then chains (714) the required handlers together and executes each handler in the chain on the outgoing message in turn (step 716). Then the PEP virtual machine encrypts (718) the SOAP message header with the public key of the destination PEP VM and forwards the encrypted message to the Base Service Manager (step 720).

The Base Service Manager then uses the EPR data (EPR stands for "end point reference"—the address of the web service, expressed with WS-Addressing standard) in the message to send (722) the message to the appropriate WS instance virtual machine on the other enterprise's web server 12B.

The steps which would be carried out by Enterprise B's web server 12B on receipt of the SOAP message will now be explained with reference to FIG. 8.

Firstly, the Base Station Manager detects (802) that a SOAP message has been received, and forwards (804) it to the local PEP virtual machine.

On arrival at the PEP virtual machine, the PEP virtual machine uses the private key component of its Storage Root Key to decrypt (806) the header of the SOAP message.

Having decrypted the header, the PEP virtual machine reads the destination endpoint address from the message header, and then, in a policy-driven manner, builds (810-812) and executes (816) a dynamic handler chain on the message in much the same way as described above in relation to the processing by the PEP virtual machine of an outbound message.

Once those processes have been carried out on the message (it is to be understood that it is possible that one of the handlers would delete the message or otherwise prevent it from being forwarded to the relevant web service virtual machine), the SOAP message is forwarded (816-820) to the web-service-specific virtual machine indicated by the destination endpoint address in the SOAP message header (it is to be understood that as explained above access to all the virtual machines goes via the Base Service Manager which is able to provide "translation" of WS EPRs into virtual machine identifiers). Once received at the web service virtual machine, the payload of the message is decrypted (step 822) using the private key component of the Storage Root Key of the recipient WS instance virtual machine. The distributed application then continues with receiving web service responding (824) to the message in accordance with the data contained with the message.

Figure 9:
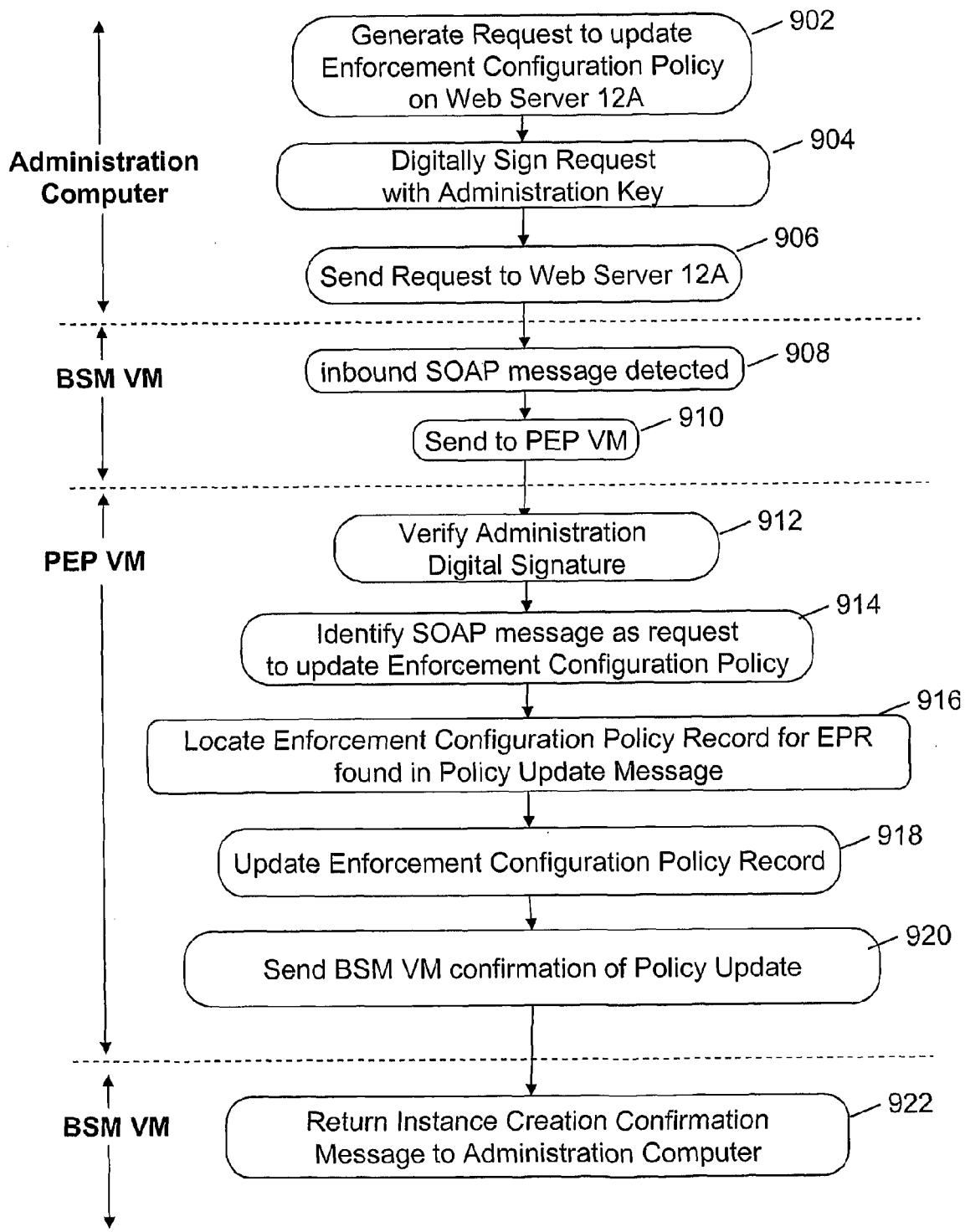
FIG. 9 shows how the administrator of a distributed application can update policies related to that distributed application.

The use of the Enforcement Configuration Policy and the other policies mentioned above has the beneficial result that the behaviour of the security programs in relation to a given distributed application can be changed with immediate effect and without the need to redeploy or restart the protected resources or any other part of the system. Thus, the administrator of each web service instance needs to have access to read and even edit its configuration file contained within the PEP partition. The mechanism for doing this will now be described with reference to FIG. 9.

The network administrator would first using the administration computer 16A.

The software on the administration computer 16A, 16B provides an administrator with a graphical user interface which allows the administrator edit the enforcement configuration policy of the web service. Using that interface, the administrator generates a request (step 902) to update the Enforcement Configuration Policy for a given web service instance on the web server 12A, 12B. The request includes an EPR value for the web service, and the updated Enforcement Configuration Policy. The administration computer 16A, 16B signs that request (step 904) with a private administration key and sends (step 906) the signed request to the web server 12A, 12B.

The message arrives at the Base Service Manager virtual machine where it is found to be a SOAP message (step 908) and sent (step 910) to the Policy Enforcement Point virtual partition.

The PEP VM then verifies (step 912) that the message comes from the administrator and identifies (step 914) the SOAP message as a request to update an Enforcement Configuration Policy. This results in the replacement of the existing Policy record with the updated version (step 616).

Using the indirect addressing discussed above, the PEP VM then sends (step 920-22) confirmation to the administration computer 16A, 16B that the Enforcement Configuration Policy has been successfully updated.

It will be seen how the above embodiment addresses the following three important security problems:
- securing the configuration file (policy) of each "instance" of the web service;
- securing the data of each service instance; and
- securing the memory used by the service instance.

In the above embodiment, these concerns are addressed by using the principle of secure containment, with the support of tamper-resistant or tamper-sensitive secure hardware.

The underlying idea is that each instance of a web service is run inside an isolated partition that has no access to any resources (including memory and data handles) used by another similarly isolated compartment. The trusted hardware base such as the TPM is logically emulated within each compartment and can hence be assumed to be dedicated to each partition for all practical purposes.

Many variations on the above described embodiment are possible, these include:

i) in the above embodiment the Policy Enforcement Point was shared by many web services instances running in separate partitions. In alternative embodiments, an architecture that uses a separate PEP deployment per web service instance partition is used. Whilst this is more secure, such architecture would involve the replication of the action repository across each partition. This is because, since the dynamic handler chain can be dynamically updated within the lifetime of an instance, a secure non-shared instance of every possible applicable action in the repository should be made available within that partition.

While this architectural option can provide adequate level of security—especially, unlike the first embodiment, it does not require that resources like physical memory be shared between action chains that operate on different SOAP messages directed for different web service instances—it encourages code replication, unnecessarily high resource utilisation, and complicates the management and configuration of the security enforcement system.

ii) any one of the software items might be provided via a network connection rather than be installed or loaded from a CD-ROM;

iii) in the above embodiment, the Policy Enforcement Point mediated in both inbound and outbound messages. In other embodiments, it might only mediate in inbound messages, or only in outbound messages.

iv) in the above embodiment, hardware constructed and operating in accordance with the Trusted Platform Module specifications was used. In other embodiments, other types of tamper-resistant hardware storing cryptographic keys might be used instead.

In summary, distributed computer system is disclosed in which computers co-operate with one another by sending messages over a network such as the Internet in order to perform a distributed application. In order to improve the security of such system, each web service involved in the distributed application runs in a separate virtual machine. Furthermore, the virtual machines on a web server dedicated to respective web service instances utilise the same policy enforcement point—running in another virtual machine on the web-server—in order to handle messages for or from the web server. To increase security still further, each virtual machine provides virtual cryptoprocessor functionality which is used in the processing of messages sent in the performance of the distributed application.

What is claimed is:

1. A computer for use in a network of computers which interact by passing messages between them in order to perform a plurality of distributed applications, said computer being arranged in operation to:
i) provide two or more local-component-hosting virtual machines, and a shared message-handling virtual machine, each with its own access control mechanism;
ii) in said local-component-hosting virtual machine, execute one or more local components of a corresponding distributed application;
iii) in said shared message-handling virtual machine, store separately for each local-component-hosting virtual machine, an enforcement configuration file specific to said local component, which file specifies a set of one or more security actions to be carried out on said messages to and/or from said local-component-hosting virtual machine;
iv) intercept messages between said local-component-hosting virtual machines and other computers; and
v) on intercepting a message, execute, in said shared message-handling virtual machine, a message handling program to perform one or more security actions on said message, as specified in the enforcement configuration file applicable to messages to and/or from the local-component-hosting virtual machine involved in the communication of the intercepted message.

2. A computer according to claim 1 wherein
said computer node includes tamper-resistant hardware which stores one or more private cryptographic keys and said message-handling virtual machine and/or one or more of said local-component-hosting virtual machines provides its own virtualised version of that tamper-resistant hardware.

3. A computer according to claim 2 wherein
one or more of said virtual machines support remote attestation.

4. A computer according to claim 2 wherein
one or more of said virtual machines supports encryption and sealing.

5. A method of operating a computer in a computer network, said method comprising:
i) running two or more local-component-hosting virtual machines, and a shared message-handling virtual machine, each with its own access control mechanism;
ii) executing a local component of a distributed application in each of said local-component-hosting virtual machines;
iii) storing, in said shared message-handling virtual machine, separately for each local-component-hosting virtual machine, a corresponding enforcement configuration file, which file specifies a set of one or more security actions to be carried out on said messages to and/or from said local-component-hosting virtual machine;
iv) intercepting messages between said local-component-hosting virtual machines and other computers; and
v) on intercepting a message, handling said message by executing, in said shared message-handling virtual machine, a message handling program to perform one or more security actions on said intercepted message as specified by whichever enforcement configuration file applies to the local-component-hosting virtual machine involved in the communication of the intercepted message.

6. A non-transitory machine-readable storage medium comprising instructions that when of executed by a computer, cause the computer at least to:
i) run two or more local-component-hosting virtual machines, and a shared message-handling virtual machine, each with its own access control mechanism;
ii) execute a local component of a distributed application in each of said local-component-hosting virtual machines;
iii) store, in said shared message-handling virtual machine, separately for each local-component-hosting virtual machine, a corresponding enforcement configuration file, which file specifies a set of one or more security actions to be carried out on said messages to and/or from said local-component-hosting virtual machine;
iv) intercept messages between said local-component-hosting machines and other computers; and
v) on intercepting said message, handle said message by executing, in said shared message-handling virtual machine, a message handling program to perform one or more security actions on said intercepted message as specified by whichever enforcement configuration file applies to the local-component-hosting virtual machine involved in the communication of the intercepted message.

* * * * *